(12) United States Patent
Silzle et al.

(10) Patent No.: US 9,180,822 B2
(45) Date of Patent: Nov. 10, 2015

(54) VEHICLE WITH SOUND WAVE REFLECTOR

(71) Applicant: Fraunhofer-Gesellschaft zur Foerderung der angewandten Forschung e.V., Munich (DE)

(72) Inventors: Andreas Silzle, Buckenhof (DE); Ulrik Heise, Vienna (AT); Stefan Varga, Erlangen (DE); Matthias Lang, Berching (DE); Oliver Hellmuth, Erlangen (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 209 days.

(21) Appl. No.: 13/753,791

(22) Filed: Jan. 30, 2013

(65) Prior Publication Data
US 2013/0142353 A1    Jun. 6, 2013

Related U.S. Application Data

(63) Continuation of application No. PCT/EP2011/062991, filed on Jul. 28, 2011.

(60) Provisional application No. 61/369,265, filed on Jul. 30, 2010.

(51) Int. Cl.
*B60R 11/02* (2006.01)
*H04R 5/02* (2006.01)
(Continued)

(52) U.S. Cl.
CPC ............ *B60R 11/0217* (2013.01); *H04R 1/323* (2013.01); *H04R 5/023* (2013.01); *B60R 2011/0028* (2013.01); *B60R 2013/016* (2013.01); *H04R 2499/13* (2013.01)

(58) Field of Classification Search
CPC ........ H04R 2499/13; H04R 3/12; H04R 5/02; H04R 5/023; H04R 1/34; H04R 1/32; H04R 1/323; H04R 2201/021; H04R 2205/024; G10K 11/28; B60R 11/0217; B60R 2011/0028; B60R 2013/016
USPC ............ 381/86, 337, 339, 160, 389; 181/175, 181/204, 284, 287, 290
See application file for complete search history.

(56) References Cited

U.S. PATENT DOCUMENTS 3,961,684 A    6/1976 Michael et al.
4,020,284 A    4/1977 Phillips
(Continued)

FOREIGN PATENT DOCUMENTS

CN    2622971 Y    6/2004
CN    1930915 A    3/2007
(Continued)

*Primary Examiner* — Vivian Chin
*Assistant Examiner* — Jason R Kurr
(74) *Attorney, Agent, or Firm* — Michael A. Glenn; Perkins Coie LLP (57) ABSTRACT

Embodiments disclose a vehicle which has a vehicle ceiling having a first sound wave reflection portion having a first sound wave reflection characteristic and a second portion having a second sound wave reflection characteristic, wherein the first sound wave reflection portion is more sound wave reflecting than the second sound wave reflection portion and at least one speaker arranged in the vehicle, so that a main sound emission direction is directed to the first sound wave reflection portion, so that a sound wave emitted by the speaker and reflected by the first sound wave reflection portion is perceptible as a diffuse sound by a person in the vehicle.

23 Claims, 5 Drawing Sheets

(51) Int. Cl.
  *H04R 1/32* (2006.01)
  *B60R 11/00* (2006.01)
  *B60R 13/01* (2006.01)

(56) References Cited

U.S. PATENT DOCUMENTS

| | | | |
|---|---|---|---|
| 4,641,345 A | | 2/1987 | Takahashi |
| 5,031,220 A | | 7/1991 | Takagi et al. |
| 5,133,017 A | | 7/1992 | Cain et al. |
| 5,268,539 A | * | 12/1993 | Ono .................. 181/155 |
| 5,784,473 A | * | 7/1998 | Ferren ................ 381/86 |
| 5,887,071 A | | 3/1999 | House |
| 6,078,669 A | * | 6/2000 | Maher ................ 381/17 |
| 7,424,127 B1 | | 9/2008 | Holmi et al. |
| 7,688,989 B2 | | 3/2010 | Willems |
| 7,787,637 B2 | * | 8/2010 | Kong ................ 381/86 |
| 8,090,116 B2 | * | 1/2012 | Holmi et al. .......... 381/86 |
| 8,162,099 B2 | * | 4/2012 | Nakaguro et al. ....... 181/175 |
| 8,538,037 B2 | | 9/2013 | Herre et al. |
| 2003/0035552 A1 | * | 2/2003 | Kolano et al. ......... 381/77 |
| 2004/0109575 A1 | | 6/2004 | Thigpen et al. |
| 2005/0259831 A1 | | 11/2005 | Hutt et al. |
| 2006/0045291 A1 | | 3/2006 | Smith |
| 2007/0014425 A1 | | 1/2007 | Matsuhashi |
| 2007/0195982 A1 | | 8/2007 | Saiki et al. |
| 2009/0257616 A1 | | 10/2009 | Kaneda et al. |
| 2009/0304198 A1 | | 12/2009 | Herre et al. |
| 2010/0148550 A1 | | 6/2010 | Kidd |

FOREIGN PATENT DOCUMENTS

| | | |
|---|---|---|
| CN | 101746300 A | 6/2010 |
| EP | 1077156 | 2/2001 |
| EP | 1077583 | 2/2001 |
| EP | 1978776 | 8/2008 |
| JP | S60-133952 | 9/1985 |
| JP | H05-82196 | 11/1993 |
| JP | H06-45865 | 6/1994 |
| JP | 3085096 | 9/2000 |
| JP | 2001-78288 | 3/2001 |
| JP | 2005167378 | 6/2005 |
| JP | 2005-268911 | 9/2005 |
| JP | 2007276568 A | 10/2007 |
| JP | 2009107603 A | 5/2009 |
| JP | 4311487 | 8/2009 |
| KR | 20010099425 | 11/2001 |
| KR | 20080113412 | 12/2008 |
| KR | 20100054466 | 5/2010 |
| RU | 2149788 | 5/1998 |
| RU | 2365063 C2 | 8/2009 |

* cited by examiner

VEHICLE WITH SOUND WAVE REFLECTOR

CROSS-REFERENCE TO RELATED APPLICATIONS

This application is a continuation of copending International Application No. PCT/EP2011/062991, filed Jul. 28, 2011, which is incorporated herein by reference in its entirety, and additionally claims priority from U.S. Patent Application No. 61/369,265, filed Jul. 30, 2010, which is also incorporated herein by reference in its entirety.

BACKGROUND OF THE INVENTION

The present invention relates to a vehicle which comprises a sound wave reflector so that a sound wave emitted by a speaker and reflected at the sound wave reflector can be perceived as diffuse sound.

U.S. Pat. No. 7,424,127 B1 describes a seat mounted speaker, wherein in the backrest of the seat two electro-acoustical transducers or speaker are integrated and orientated such that the respective axes are substantially vertical to a person's head sitting on the vehicle seat. The transducers are used to facilitate the directional audio signal, such as left and right stereophonic device, which are emitted axial to the headrest in the vehicle's compartment. The integrated speaker is mainly emitting the sound waves in an axial direction of the headrest. It is the object of the U.S. patent to generate and provide an improved surround sound to passengers sitting in the vehicle.

SUMMARY

According to an embodiment, a vehicle may have: a vehicle ceiling having a first sound wave reflection portion having a first sound wave reflection characteristic and a second portion having a second sound wave reflection characteristic, wherein the first sound wave reflection portion is more sound wave reflecting than the second sound wave reflection portion; and at least one speaker arranged in the vehicle, so that a main sound emission direction is directed to the first sound wave reflection portion; wherein the first sound wave reflection portion is configured to reflect an incident sound wave, which is emitted by the at least one speaker in the main sound emission direction, in different directions for achieving a diffuse sound cloud.

According to another embodiment, a vehicle may have: a vehicle ceiling having a first sound wave reflection portion having a first sound wave reflection characteristic and a second portion having a second sound wave reflection characteristic, wherein the first sound wave reflection portion is more sound wave reflecting than the second sound wave reflection portion; and at least two speakers arranged in the vehicle, so that a main sound emission direction, is directed to the first sound wave reflection portion, so that a sound wave emitted by the speaker is reflected by the first sound wave reflection portion in different directions for achieving a diffuse sound cloud; wherein the at least two speakers are arranged in a headrest of the vehicle or in a speaker box which is attachable to a backrest or a headrest of a vehicle seat so that different sound waves are emitted by the at least two speakers in direction to the first sound wave reflection portion are de-correlated sound waves.

According to another embodiment, a vehicle may have: a vehicle ceiling having a first sound wave reflection portion having a first sound wave reflection characteristic and a second portion having a second sound wave reflection characteristic, wherein the first sound wave reflection portion is more sound wave reflecting than the second sound wave reflection portion, and wherein the first sound wave reflection portion and the second portion are formed integrally in the vehicle ceiling; and at least one speaker arranged in the vehicle, so that a main sound emission direction is directed to the first sound wave reflection portion; wherein the first sound wave reflection portion is configured to reflect an incident sound wave, which is emitted by the at least one speaker in the main sound emission direction, in different directions for achieving a diffuse sound cloud.

According to some embodiments of the invention, the vehicle comprises a vehicle ceiling, a first sound wave reflection portion and a second portion, wherein the first sound wave reflection portion is more sound wave reflecting than the second sound wave reflection portion and at least one speaker is arranged in the vehicle so that an emitted sound wave which is reflected by the first sound wave reflection portion result in a diffuse sound perception in a passenger compartment of the vehicle. The first sound wave reflection portion may be a separate element fixable at the vehicle ceiling.

According to some embodiments, the at least one speaker can be integrated in a headrest or in a speaker box which is attachable to a backrest or an normal headrest of a vehicle seat.

According to another aspect of the invention a sound processor is configured to output at least two de-correlated sound signals for two speakers arranged in a headrest of a vehicle or in a speaker box which is attachable to a backrest or a headrest of a vehicle. A de-correlator may be used to de-correlate the two output signals.

BRIEF DESCRIPTION OF THE DRAWINGS

Embodiments of the present invention will be detailed subsequently referring to the appended drawings, in which.

DETAILED DESCRIPTION OF THE INVENTION

As reference to the accompanying FIGS. 1-5, explanations and embodiments relating to a vehicle with a sound wave reflector and a speaker arranged in the vehicle so that an emitted sound wave which is reflected at the sound wave reflector, is perceptible as a diffuse sound by a passenger of the vehicle.

Figure 1:
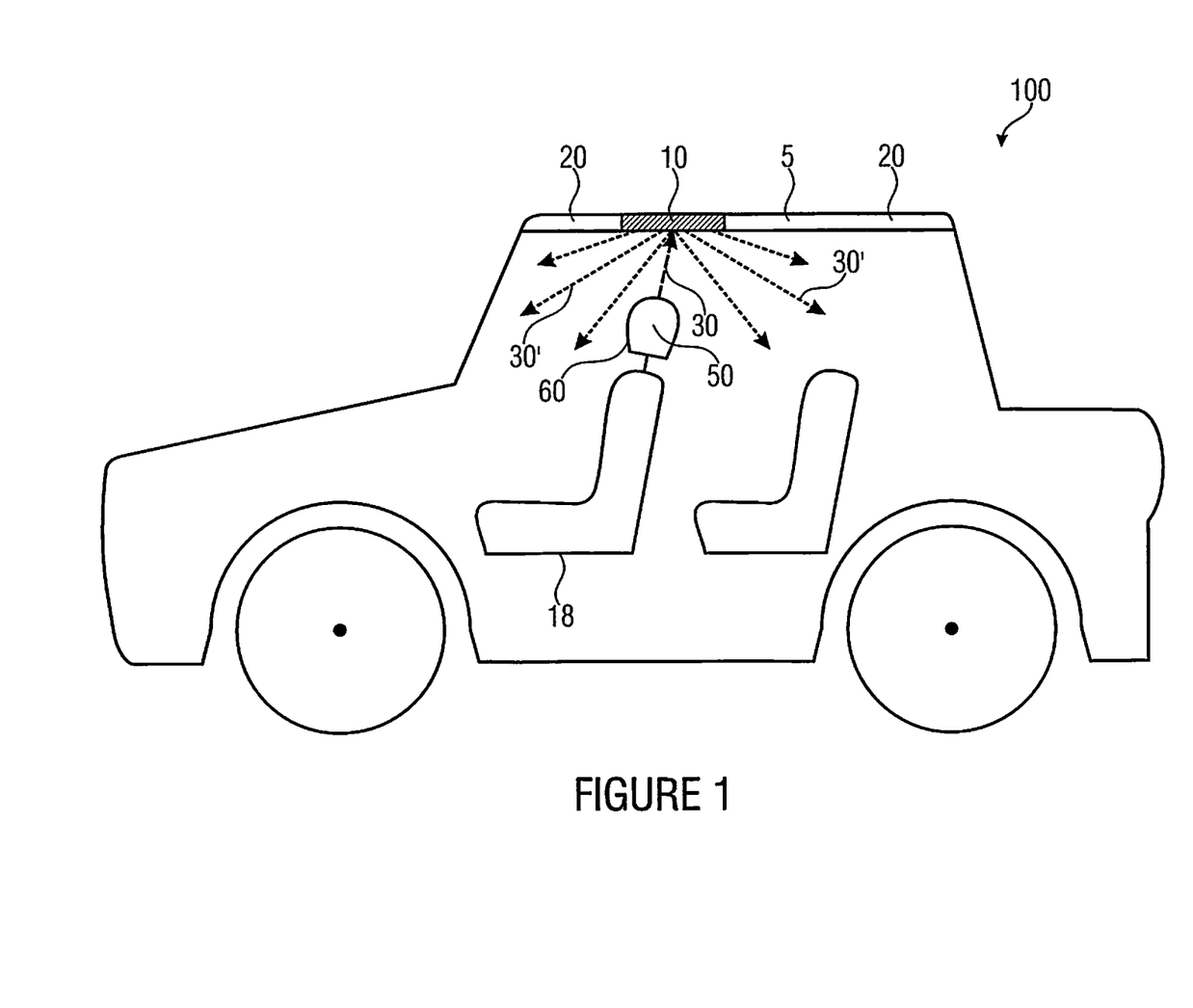
FIG. 1 shows a schematic side view of a vehicle comprising a sound wave reflector in a vehicle ceiling according to an embodiment of the invention.

In FIG. 1 a schematic side view of a vehicle according to embodiments of the invention is depicted. The vehicle 100 comprises a vehicle ceiling 5 having a first sound wave reflection portion 10, wherein the first sound wave reflection portion 10 has a first sound wave reflection characteristic. Furthermore, the vehicle ceiling 5 comprises a second portion 20 having a second sound wave reflection characteristic. According to embodiments the first sound wave reflection portion 10 is more sound wave reflecting than the second sound wave reflection portion 20. In addition, at least one speaker 50 is arranged in the vehicle 100, so that a main sound emission direction 30 of the speaker is directed to the first sound wave reflection portion 10. As a result a sound wave, which is emitted by the speaker 50, is reflected at the first sound wave reflection portion 10 and is perceptible as a diffuse sound by a person in the vehicle.

The expression "vehicle" may include, for example, an automobile, a bus, a train, an airplane, a ship, a subway, etc. In general, a vehicle may be any means capable for transporting persons in the air, on the water, on the ground or in the underground. The first sound wave reflection portion is also named sound wave reflector herein.

The schematic vehicle 100 shown in FIG. 1 is, for example, an automobile having front and back seats. In other vehicles a plurality of vehicle seats may be available according to further embodiments of the invention. The at least one speaker 50 may be integrated, for a example, in a headrest 60, which is mounted to a front seat 18. The first sound wave reflection portion 10 and the second portion 20 may be formed integrally in the vehicle ceiling. Both portions, the first sound wave reflection portion 10 and the second portion 20 may form together the vehicle ceiling 5 or at least a part of the vehicle ceiling. The first sound wave reflection portion 10 and the second portion 20 may be made of a different material so that the first sound wave reflection characteristic is different to the second sound wave reflection characteristic of the second portion 20. The first sound wave reflection characteristic describes the first sound wave reflection portion 10 as more sound wave reflecting than the second sound wave reflection characteristic the second portion. A sound wave which irradiates the first sound wave reflection portion 10 may be reflected which a smaller loss compared to a sound wave which is reflected at the second portion 20.

The speaker 50, which may be integrated in the headrest 60, can emit during operation a sound wave in direction to the first sound wave reflection portion 10, so that the emitted sound wave is reflected at the first sound wave reflection portion 10. The reflected sound wave may be directed in different directions within the passenger's compartment so that a diffused sound cloud is achieved. This means, a person sitting in the vehicle can perceive an improved diffuse sound, if the emitted sound is reflected at the sound wave reflector 10. It may be difficult for a passenger to locate the source of the diffused sound cloud, i.e. the at least one speaker. According to other embodiments the speaker may be arranged at a different place in the vehicle, so that a main sound emission direction 30 is directed to the first sound wave reflection portion 10.

According to some embodiments, the material for the first sound wave reflection portion may comprise, for example, one of the materials, plastic, synthetic material, wood, metal, steel, metal sheet, glass, stone etc. The second portion 10 may also comprise, for example, plastic, synthetic material, metal, fabric, wood, man-made fibre or other proper materials for a vehicle ceiling. The second portion 20 may be made of a material having a higher sound absorption coefficient than the first sound wave reflection portion. In embodiments, the first sound wave reflection portion may have a first sound wave reflection characteristic which is different to a second sound wave characteristic of the second portion 20. The fist sound wave reflection portion 10 may have a higher reflectivity for sound waves than the second portion. This means, the first sound wave reflection portion may have a higher sound reflection factor or coefficient than the second portion. The second portion 20 may be a better sound absorber than the first sound wave reflection portion 10. The second portion may comprise a sound absorbing material, whereas the first sound wave reflection portion may comprise a material with a higher sound power reflection coefficient than the second portion. The second portion 20 may have a stronger sound absorption characteristic than the first sound wave reflection portion.

According to some embodiments, the first sound wave reflection portion 10 can be made of a material which is harder than the material of the second portion 20, so that a sound wave is reflected from the first sound wave reflection portion with less losses compared to a sound wave reflected at the second portion. The hardness of the first sound wave reflection portion 10 having a first sound wave reflection characteristic may be higher than a hardness of the second portion 20 having a second sound wave reflection characteristic.

The shape of the first sound wave reflection portion 10, which can be integrated in the vehicle ceiling 5 or which can be a separate element which is fixed at the vehicle ceiling 5, may be, for example, rectangular, round, ellipsoid, triangular, trapezoid or polygonal.

According to some embodiments, the surface of the first sound wave reflection portion 10 is different to a surface of the second portion 20. The first sound wave reflection portion and the second portion can be made of the same or a different material, but the first sound wave reflection portion may have a different surface than a second portion according to some embodiments. The structure of the surfaces of the first sound wave reflection portion and the second portion may be different. Because of the different surfaces, the first sound wave reflection portion may be more sound wave reflecting than the second portion, if a sound wave is incident to the first sound wave reflection portion and to the second portion.

The first sound wave reflection portion 10 may have a size between 50 cm$^2$ to 10,000 cm$^2$, 100 cm$^2$ to 3,000 cm$^2$ or between 200 cm$^2$ to 1,000 cm$^2$. In some embodiments, the first sound wave reflection portion is arranged above the at least one speaker 50 in the vehicle 100. This means, the at least one speaker 50 can irradiate a sound wave upwardly in direction to a vehicle ceiling so that the sound wave is reflected at the first sound wave reflection portion 10. The first sound wave reflection portion may be mounted, fixed or integrated in the vehicle ceiling 5. In some embodiments, a first sound wave reflection portion 10 may be a separate element which can be fixed at the vehicle ceiling 5. The second portion 20 may be the surrounding vehicle ceiling. The first sound wave reflection portion may be mounted directly above a speaker which is incorporated in a headrest or in a speaker box which is attachable to the headrest or to a backrest of a vehicle seat. During operation, the speaker is then emitting upwardly a sound wave mainly to the first sound wave reflection portion. In general, a main sound emission direction 30 of the at least one speaker 50 may be directed to the first sound wave reflection portion 10, so that an emitted sound wave hits mainly the first sound wave reflection portion 10. The speaker 50 may be arranged inclined with respect to a vehicle wall and a main sound emission direction may be directed to the sound wave reflector.

Figure 2:
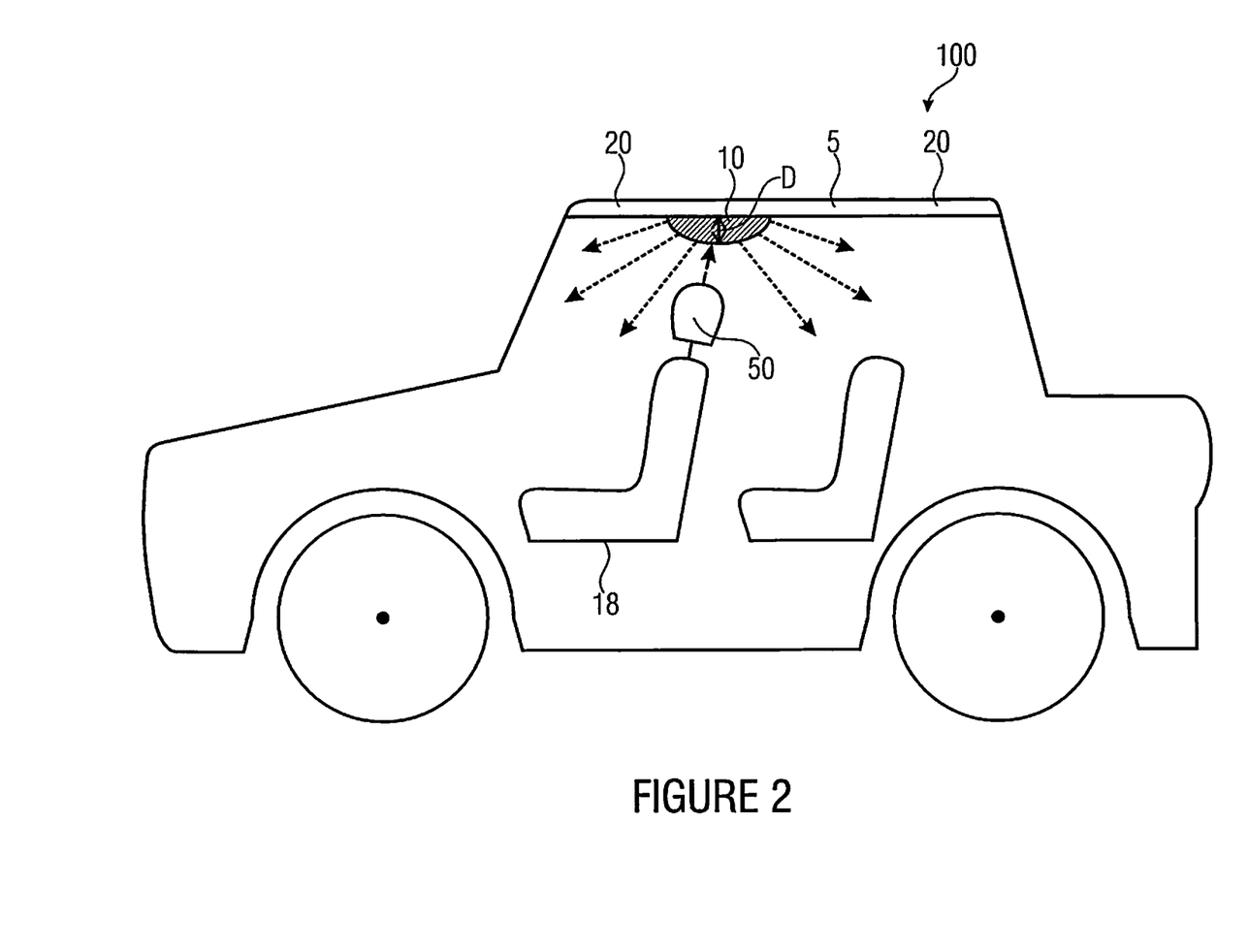
FIG. 2 shows another side view of a vehicle comprising a separated sound wave reflector at the vehicle ceiling according to another embodiment of the invention.

In FIG. 2, a further schematic side view of a vehicle according to an embodiment of the invention is depicted. In this embodiment the first sound wave reflection portion 10 may be a separate element which is mounted to the vehicle ceiling 5, wherein the vehicle ceiling is forming the second portion 20. The first sound wave reflection portion 10 can be, for example, mechanically fixed to the vehicle ceiling. The surrounding vehicle ceiling area may form the second portion 20, as described herein. The first sound wave reflection portion 10 may comprise a surface which is, for example, at least partly formed convex, so that an incident sound wave which is reflected at the convex portion is reflected in different directions in a passenger's compartment. As a consequence, a person in the vehicle may have a diffuse sound perception, i.e. the person may not be able to exactly locate the position of the speaker. The sound wave reflector may have a rectangular shape and a convex surface. The thickness D of the convex sound wave reflector at the vertex or a distance D between the vehicle ceiling and the vertex may be, for example, between 0.5 cm and 5 cm, e.g. about 1 cm. The sound wave reflector can be, for example, a metal or plastic sheet which is convex curved, wherein the distance D from the vehicle ceiling to the vertex 11 or apex of the convex curved sheet is between 0.5 cm and 5 cm.

Figure 3:
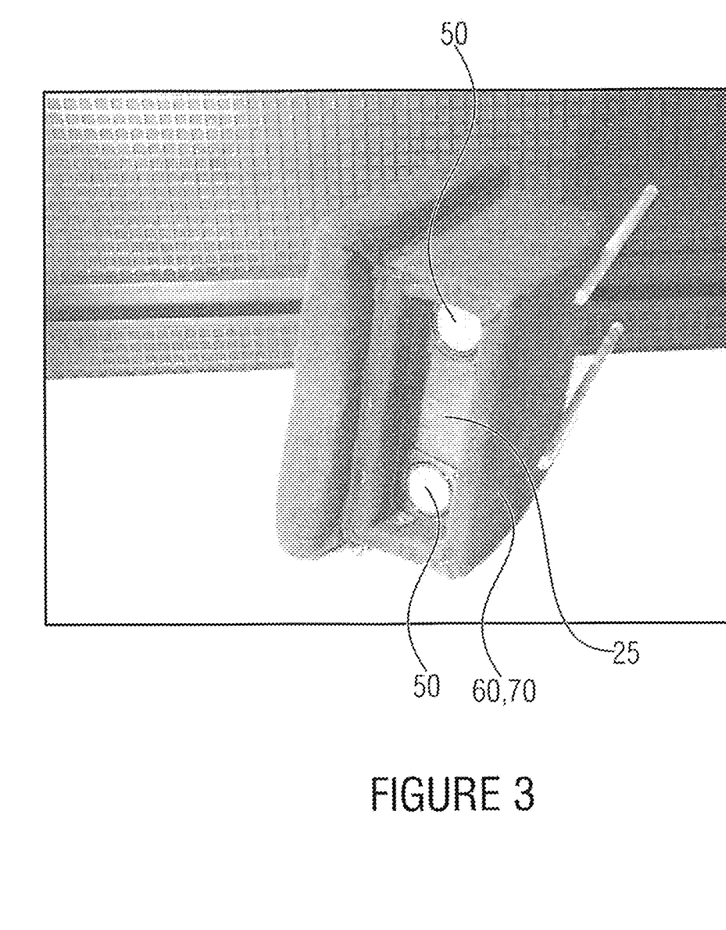
FIG. 3 shows a photo of a headrest comprising two speakers in order to generate a de-correlated sound.

According to some embodiments in FIG. 3, the speaker 50 may be integrated in a headrest 60, for a vehicle seat or in a speaker box 70, which can be attached to a headrest or to a backrest of a vehicle seat. In FIG. 3, the headrest 60 or the speaker box 70 comprise two speakers 50, which are lowered arranged in the headrest or in the speaker box, so that sound waves which are emitted from the single speakers are mixed in the chamber 25. By means of the lowered speaker in the chamber 25 a de-correlated diffuse sound cloud can be generated which is then reflected via the first sound wave reflection portion 10 into the passenger's compartment, so that a person in the vehicle has a diffuse sound perception.

According to some embodiments, the vehicle 100 may comprise at least two speakers 50 arranged in a headrest 60 or in a speaker box 70, wherein the speaker box is attachable to a backrest or an usual headrest of a vehicle seat, so that different sound waves emitted by the at least two speakers and which are reflected by the first sound wave reflection portion 10 are perceptible as de-correlated sound waves. The speakers 50 may be lowered arranged in the headrest as it is shown in FIG. 3 or according to further embodiments in a speaker box which can be fixed at an usual headrest or a vehicle seat. According to other embodiments, the speakers are not lowered in a headrest of the vehicle or in a speaker box.

The at least one speaker 50 may be arranged in a chamber 25 formed in the headrest or a speaker box 70. The chamber may have a sound outlet opening, so that a sound wave emitted in a main sound emission direction 30 by a speaker during operation hits the first sound wave reflection portion 10. As it is shown in FIG. 3, the sound outlet opening may consist, for example, of a missing top side wall of the chamber 25 or speaker box.

In FIG. 3, the at least one speaker 50 is arranged in an open top chamber 25, so that an emitted sound wave can escape in a upwardly direction. In other embodiments the sound outlet opening may be formed, for example, by slots or holes in a wall of the headrest or speaker box.

Figure 4:
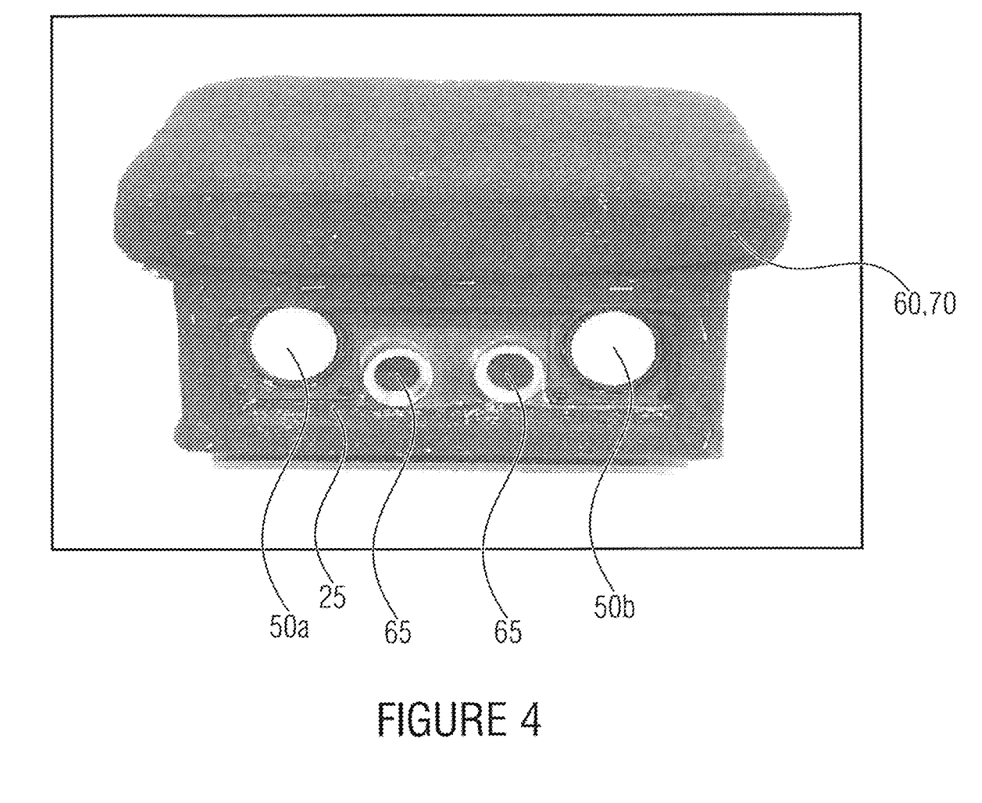
FIG. 4 shows a photo of a headrest or a speaker box comprising two speakers and bass-reflex tubes according to another embodiment of the invention.

In FIG. 4 another embodiment of a speaker, which is arranged in a headrest of a seat for a vehicle is depicted. In this embodiment, again two speakers 50*a*, 50*b* are arranged in a headrest 60 or in a speaker box 70 and furthermore two bass-reflex-tubes 65 are also integrated in the headrest 60, respectively in the speaker box 70. By means of the bass reflex tubes, the emitted sound may be more saturated.

The at least one speaker 50 may be part of an audio sound system of the vehicle. Such an audio sound system may, for example, comprise a sound processor which is configured to output two de-correlated sound signals. A first signal for a first speaker 50*a* in a headrest 60, or in a speaker box 70, attachable to a backrest or a headrest of a vehicle seat and a second sound signal for a second speaker 50*b* in a headrest 60 or in a speaker box 70, attachable to a backrest or an usual headrest of a vehicle seat. The first and the second sound signals may be different sound signal. This means, the speakers 50*a*, 50*b* may emit different sound signals which can be, for example, in the above-mentioned chamber 25 mixed, so that a de-correlated sound wave can be emitted in direction to the first sound wave reflection portion 10. The chamber 25 may act as a de-correlator for generating a first output signal being de-correlated from a second output signal. The de-correlator may be formed by the chamber, comprising the lowered arranged first and second speakers 50*a* and 50*b*. In general, the sound processor may further comprise a de-correlator for generating a first output signal being de-correlated from a second output signal.

Figure 5:
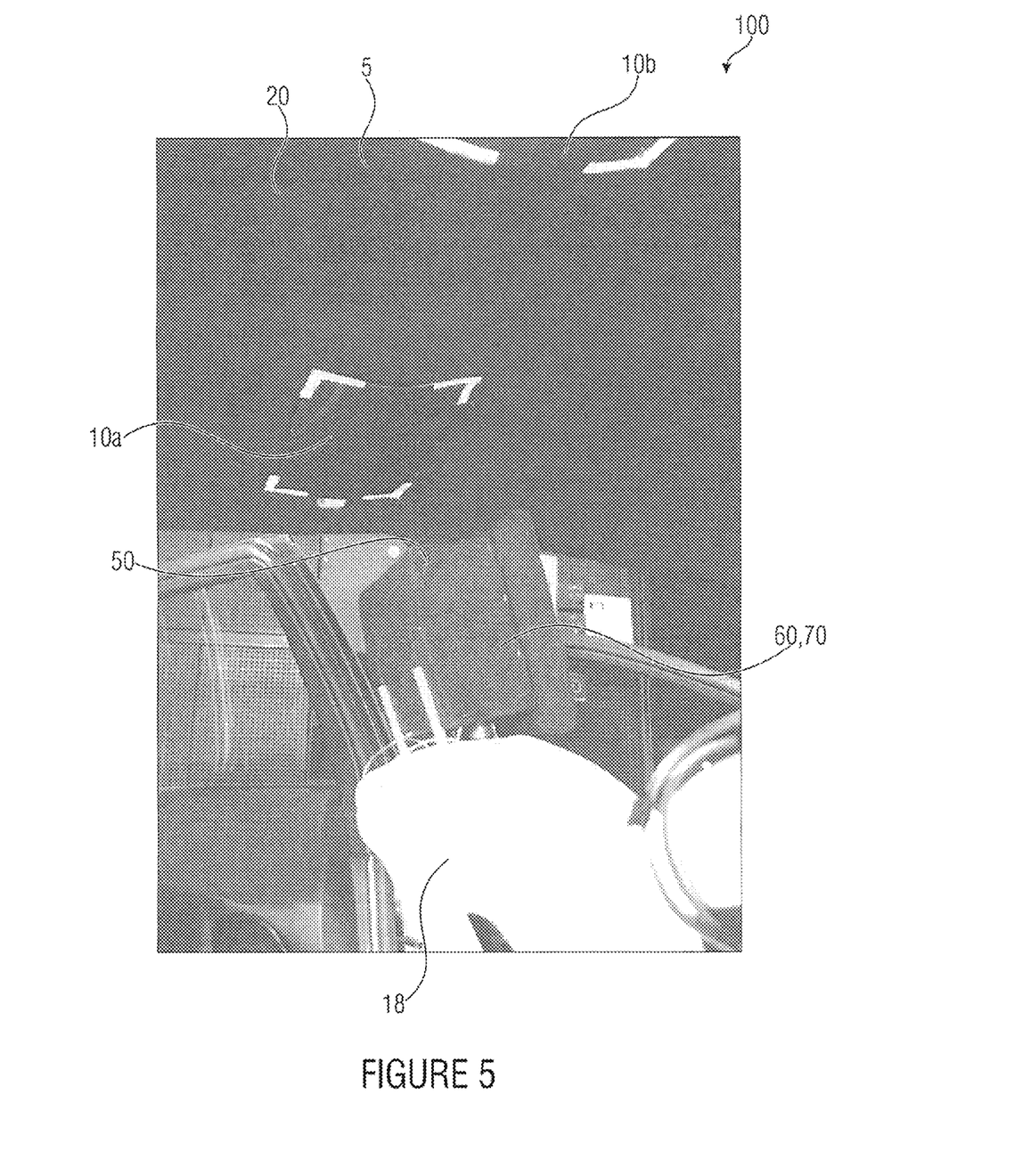
FIG. 5 shows another photo of a vehicle detail with two first sound wave reflection portions and a corresponding headrest for a vehicle seat, comprising at least one speaker according to an embodiment of the invention.

In FIG. 5, a photo of a part of a vehicle 100 with a vehicle ceiling 5 having a first sound wave reflection portion 10*a,b* and a second portion 20 having a second sound wave reflection characteristic and at least one speaker 50, which, in this embodiment, is arranged in the headrest 60 or speaker box 70. The speaker box 70 may be, for example, mechanically fixable to an usual headrest or to a backrest of a vehicle seat 18. In the automobile shown in FIG. 5, the sound wave reflector 10*a* is, for example, arranged above a first front seat and a second sound wave reflector 10*b* is arranged above a second front seat of the automobile. In other embodiments, a sound wave reflector 10, respectively a first sound wave reflection portion 10 may be arranged above rear seats of a vehicle. In other vehicles, for example, in airplanes or ships, there may be a plurality of first sound wave reflection portions arranged at a vehicle ceiling. In some embodiments, a common first sound wave reflection portion may be assigned to a plurality of a vehicle seats. Each vehicle seat may comprise, for example, a headrest with at least one speaker, wherein the main sound emission direction of the speaker is directed to the common first sound wave reflection portion 10.

According to an aspect of the invention, the sound processor is configured to output de-correlated sound signals—a first signal for a first speaker in a headrest or in a speaker box, attachable to a backrest or a headrest of a vehicle seat and a second sound signal for a second speaker in the headrest or in the speaker box. In general, the vehicle 100 may comprise a plurality of speakers which are controlled by a sound processor, respectively, an audio sound system which controls different sound channels.

Embodiments of the invention also concern a headrest speaker arrangement. A novel speaker arrangement in headrests and the control of the same is described herein, which is according to some embodiments for a three-dimensional sound reproduction, in small space volumes, e.g. in a passengers compartment or an auto cabin, particular well sufficient.

According to some embodiments, two speakers are built-in in a headrest of a seat, for example, a vehicle seat. If a vehicle comprises four seats, the two headrests of the front seats can be sufficient. The speakers can irradiate upwards to a ceiling of the vehicle. According to some embodiments, at the ceiling of the vehicle, for example, above the headrest a harder region than the surrounding usual vehicle ceiling is installed in order to achieve a good reflection of the emitted sound waves. The harder region 10, may be, for example, a plastic plate. The harder region 10 is described herein, also as a sound wave reflector 10 or first sound wave reflection portion 10 which can be mounted at the vehicle ceiling above the headrest. The surface of the sound wave reflector can be slightly curved convex —, for example, about 1 cm—in order to support a diffuse sound irradiation. The size of the sound wave reflector may be, for example, 340×180 mm.

According to other embodiments, the area of the sound wave reflector may be, for example, between 50 cm² and 10000 cm² or between 100 cm² and 2000 cm² The sound wave reflector 10 may have, for example, a quadratic, a rectangular, a round or a trapezoid shape. The usage of the headrests allows to use sufficient large speakers with a not too small volume behind. This can be of advantage to achieve a sufficient lower cut-off frequency of, from e.g. 150 Hz. In order to reproduce a de-correlated stereophonic signal per person, two speakers per headrest have to be used. Above the speakers in the headrest there is one common chamber space 9 for both speakers.

Because of a lowering of the speakers with respect to a top edge from at least 40 mm in the headrest and by the mixture of both speaker signals in the resulting chamber 9 and by the partial radiation via the reflector 10, the speaker 50 itself cannot be located and a desired diffuse sound cloud from an upper side can be achieved. This applies for a person in front of the headrest, as well as, for a person behind the headrest on a rear seat with respect to the sound perception. An extension of this sound cloud and a three-dimensional perception can be achieved by other speakers in the reproduction space by the reproduction via further pairs of de-correlated signals.

According to embodiments, the at least one speaker in a headrest of a vehicle seat or a speaker box, as described herein, may be part of a larger audio sound system, which includes further speakers distributed in a vehicle's compartment.

While this invention has been described in terms of several embodiments, there are alterations, permutations, and equivalents which will be apparent to others skilled in the art and which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. A vehicle, comprising:
   a vehicle ceiling comprising a first sound wave reflection portion comprising a first sound wave reflection characteristic and a second portion comprising a second sound wave reflection characteristic, wherein the second portion is made of a material having a higher sound absorption coefficient than the first sound wave reflection portion, wherein a surface of the first sound wave reflection portion is more sound wave reflecting than a surface of the second sound wave reflection portion; and
   at least one speaker arranged in a headrest of the vehicle or in a speaker box which is attachable to a backrest or the headrest of a vehicle seat, so that a main sound emission direction is directed to the first sound wave reflection portion;
   wherein the surface of the first sound wave reflection portion is configured to reflect an incident sound wave, which is emitted by the at least one speaker in the main sound emission direction, in different directions for achieving a diffuse sound cloud.

2. The vehicle according to claim 1, wherein the first sound wave reflection portion is integrated in the vehicle ceiling.

3. The vehicle according to claim 1, wherein the first sound wave reflection portion and the second portion are formed integrally in the vehicle ceiling.

4. The vehicle according to claim 1, wherein the first sound wave reflection portion is made of a different material than the second portion.

5. The vehicle according to claim 1, wherein the first sound wave reflection portion is made of a material which is harder than the material of the second portion.

6. The vehicle according to claim 1, wherein the first sound wave reflection portion is made of plastic, synthetic material, wood, metal, steel, metal sheet, glass or stone.

7. The vehicle according to claim 1, wherein a surface of the first sound wave reflection portion is different than a surface of the second portion.

8. The vehicle according to claim 1, wherein the first sound wave reflection portion is arranged above the at least one speaker in the vehicle.

9. The vehicle according to claim 1, wherein the first sound wave reflection portion is arranged above a first seat and another first sound wave reflection portion is arranged above a second seat in the vehicle.

10. The vehicle according to claim 9, wherein the first sound wave reflection portion is arranged vertically above a first seat and another first sound wave reflection portion is arranged vertically above a second seat in the vehicle.

11. The vehicle according to claim 1, wherein the first sound wave reflection portion comprises a size of 50 cm² to 10000 cm², 100 cm² to 3000 cm² or 200 cm² to 1000 cm².

12. The vehicle according to claim 1, wherein the at least one speaker is arranged in a chamber comprising a sound outlet opening, so that the sound wave emitted by the speaker in a main sound emission direction hits the first sound wave reflection portion.

13. The vehicle according to claim 1, wherein the at least one speaker is arranged in an open top chamber.

14. The vehicle according to claim 1, wherein the at least one speaker is arranged in a headrest for a vehicle or in a speaker box, which is attachable to a backrest or a headrest of a vehicle seat.

15. The vehicle according to claim 1, comprising at least two speakers arranged in a headrest of the vehicle or in a speaker box which is attachable to a backrest or a headrest of a vehicle seat so that different sound waves emitted by the at least two speakers in direction to the first sound wave reflection portion are de-correlated sound waves.

16. The vehicle according to claim 1, wherein the first sound wave reflection portion comprises a curved convex surface, and wherein a thickness D of the first sound wave reflection portion at a vertex of the first sound wave reflection portion or a distance D from the vehicle ceiling to the vertex of the first sound wave reflection portion is between 0.5 cm and 5 cm.

17. The vehicle according to claim 1, further comprising a sound processor configured to output two de-correlated sound signals, a first signal for a first speaker in a headrest or in a speaker box attachable to a backrest or a headrest of a vehicle seat and a second sound signal for a second headrest or a second speaker box attachable to a backrest or headrest of a vehicle seat.

18. The vehicle according to claim 17, wherein the sound processor further comprises a de-correlator for generating a first output signal being de-correlated from a second output signal.

19. The vehicle according to claim 1, wherein the first sound wave reflection portion and the second sound wave reflection portion form together at least a part of the surface of the vehicle ceiling.

20. A vehicle, comprising:
    a vehicle ceiling comprising a first sound wave reflection portion comprising a first sound wave reflection characteristic and a second portion comprising a second sound wave reflection characteristic, wherein the second portion is made of a material having a higher sound absorption coefficient than the first sound wave reflection portion, wherein a surface of the first sound wave reflection portion is more sound wave reflecting than a surface of the second sound wave reflection portion; and at least two speakers arranged in the vehicle, so that a main sound emission direction, is directed to the first sound wave reflection portion, so that a sound wave emitted by the speaker is reflected by the surface of the first sound wave reflection portion in different directions for achieving a diffuse sound cloud;

wherein the at least two speakers are arranged in a headrest of the vehicle or in a speaker box which is attachable to a backrest or a headrest of a vehicle seat so that different sound waves emitted by the at least two speakers in direction to the first sound wave reflection portion are de-correlated sound waves.

21. The vehicle according to claim 1, wherein the first sound wave reflection portion comprises a curved convex surface, and wherein a thickness D of the first sound wave reflection portion at a vertex of the first sound wave reflection portion or a distance D from the vehicle ceiling to the vertex of the first sound wave reflection portion is between 0.5 cm and 5 cm.

22. A vehicle, comprising:
a vehicle ceiling comprising a first sound wave reflection portion comprising a first sound wave reflection characteristic and a second portion comprising a second sound wave reflection characteristic, wherein the second portion is made of a material having a higher sound absorption coefficient than the first sound wave reflection portion, wherein a surface of the first sound wave reflection portion is more sound wave reflecting than a surface of the second sound wave reflection portion, and wherein the first sound wave reflection portion and the second portion are formed integrally in the vehicle ceiling; and at least one speaker arranged in a headrest of the vehicle or in a speaker box which is attachable to a backrest or the headrest of a vehicle seat, so that a main sound emission direction is directed to the first sound wave reflection portion;

wherein the surface of the first sound wave reflection portion is configured to reflect an incident sound wave, which is emitted by the at least one speaker in the main sound emission direction, in different directions for achieving a diffuse sound cloud.

23. A vehicle, comprising:
a vehicle ceiling comprising a first sound wave reflection portion comprising a first sound wave reflection characteristic and a second portion comprising a second sound wave reflection characteristic, wherein the first sound wave reflection portion is more sound wave reflecting than the second sound wave reflection portion; and at least one speaker arranged in the vehicle, so that a main sound emission direction is directed to the first sound wave reflection portion;

wherein the first sound wave reflection portion is configured to reflect an incident sound wave, which is emitted by the at least one speaker in the main sound emission direction, in different directions for achieving a diffuse sound cloud, wherein the first sound wave reflection portion comprises a curved convex surface.

* * * * *